(12) United States Patent
Le Roux

(10) Patent No.: US 6,801,395 B1
(45) Date of Patent: Oct. 5, 2004

(54) INCREASED CAPACITY VCR TAPE CASSETTE

(75) Inventor: Evert Bastiaan Le Roux, Florida (ZA)

(73) Assignee: Evity (PTY) Limited, Kya Sands (ZA)

( * ) Notice: Subject to any disclaimer, the term of this patent is extended or adjusted under 35 U.S.C. 154(b) by 234 days.

(21) Appl. No.: 10/009,992

(22) PCT Filed: Jun. 13, 2000

(86) PCT No.: PCT/ZA00/00107

§ 371 (c)(1),
(2), (4) Date: Dec. 14, 2001

(87) PCT Pub. No.: WO00/77788

PCT Pub. Date: Dec. 21, 2000

(30) Foreign Application Priority Data

Jun. 14, 1999 (ZA) ............................................. 99/3976
Sep. 30, 1999 (ZA) ............................................. 99/6263

(51) Int. Cl.[7] .............................................. G11B 23/04
(52) U.S. Cl. ..................................................... 360/132
(58) Field of Search ........................ 360/132; 242/336, 242/340, 347, 335, 352.4

(56) References Cited

U.S. PATENT DOCUMENTS

| 3,921,934 | A | | 11/1975 | Dorland et al. | 242/338.1 |
|---|---|---|---|---|---|
| 4,074,876 | A | | 2/1978 | Gourley | 242/336 |
| 4,136,843 | A | | 1/1979 | Gourley | 242/338.3 |
| 4,262,860 | A | | 4/1981 | Hurtig et al. | 242/343.2 |
| 4,405,098 | A | * | 9/1983 | Spicer | 242/336 |
| 5,239,436 | A | | 8/1993 | Aizawa et al. | 242/342 |
| 5,335,131 | A | | 8/1994 | Sato et al. | 242/347 |
| 5,415,361 | A | * | 5/1995 | Sato | 242/352.4 |
| 5,610,788 | A | * | 3/1997 | Standiford et al. | 360/132 |
| 5,734,538 | A | * | 3/1998 | Hu et al. | 360/132 |
| 6,068,207 | A | * | 5/2000 | Krula et al. | 242/340 |
| 6,354,527 | B1 | * | 3/2002 | Krula | 242/340 |

* cited by examiner

*Primary Examiner*—Jefferson Evans
(74) *Attorney, Agent, or Firm*—Young & Thompson

(57) ABSTRACT

An increased capacity VCR tape cassette for use with a front loading VHS VCR recorder and includes a forward housing section which is a substantially conventional VCR tape cassette in which the tape spools are replaced by drive wheels which are adapted for releasable engagement with the recorder tape drive spindles, a rear tape section which includes a pair of rotatable tape reels, a bridge section which defines a passage which extends from an upper level of the rear wall of the forward housing section to the rear tape section which, in use, is located on the outside of a cassette opening to the recorder, a significantly longer than conventional recording tape which is wound on the two tape reels and passes from a first tape reel through the bridge passage into the forward cassette section to be recorded on and from the cassette section back through the bridge passage and onto the second tape reel, and drive elements which extend from the forward cassette section drive wheels through the bridge passage and to the tape reels in the rear tape section of the cassette housing.

8 Claims, 2 Drawing Sheets

INCREASED CAPACITY VCR TAPE CASSETTE

FIELD OF THE INVENTION

This invention relates to an increased tape capacity VCR tape cassette for use in an unmodified, conventional front loading VHS VCR recorder.

BACKGROUND TO THE INVENTION

Conventional commercially available VCR tape cassettes generally have a recording time of up to four hours. The tapes are recorded on at a rate of twenty-five frames per second. In order to extend the recording times of these tapes time lapse technology may be employed to decrease the number of frames recorded per second. This reduction in the frame recording rate results a slow motion effect in the recording when played back.

In the security industry surveillance cameras are widely used to monitor security sensitive areas and in many security installations are connected to video tape recording machines for the recordal of activity in that area. In this application, although the time lapse recording increase the recording tape cassette change time, the slow motion effect produced by the tape could be detrimental to the accurate identification of people and/or events projected from the recorded tape.

SUMMARY OF THE INVENTION

An increased capacity VCR tape cassette for use with a front loading VHS VCR recorder according to the invention comprises a forward housing section which conforms to a conventional, i.e., standard, VCR tape cassette in which the tape spools are replaced by drive wheels which are adapted for releasable engagement with the recorder tape drive spindles, a rear tape section which includes a pair of rotatable tape reels, a bridge section which defines a passage which extends from an upper level of the rear wall of the forward housing section to the rear tape section which, in use, is located on the outside of a cassette opening to the recorder, a significantly longer than conventional recording tape which is wound on the two tape reels and passes from a first tape reel through the bridge passage into the forward cassette section to be recorded on and from the cassette section backthrough the bridge passage and onto the second tape reel, and drive means which extend from the forward cassette section drive wheels through the bridge passage and to the tape reels in the rear tape section of the cassette housing.

The passage through the bridge section of the cassette may include a throat which has a vertical dimension which is less than the width of the recording tape with the tape in its passage through the bridge section of the cassette being partially twisted from the orientation in which it is situated on the drive wheels and reels of the cassette to permit its passage through the bridge.

The upper surface of the rear tape section may be parallel to and situated above the upper surface of the forward housing section of the cassette and the bridge section includes a floor which is parallel to the upper surfaces of the forward and rear housing sections and which extends from a position on the rear wall of the forward housing section slightly below the upper surface of the forward housing section to the rear tape section and a cover piece which extends from the upper surface of the forward housing section to the rear tape section to define between it and the bridge section floor the bridge passage. Preferably, the bridge section extends over the width of the cassette and the bridge cover piece is upwardly inclined from the upper surface of the forward housing section to the rear tape section with the cover comprising a first flap which is hingedly attached and upwardly biased to the forward housing section with the width of the flap being such that its free edge parallel to the hinge, when the flap is pressed downwardly against its bias, is situated, on full insertion of the cassette into the recorder opening, on the outside of the opening and a second flap which is hingedly connected to the rear tape section with its edge portion, parallel to its hinge, bearing on the upper surface of the first cover flap.

In one form of the invention the tape reels in the rear tape section of the cassette housing are arranged in a side by side relationship in a common plane and the drive means may be endless belts which rotatably connect each of the drive wheels to a tape reel in a suitable drive ratio which will cater for the larger than normal tape reel diameters.

The tape reels may be floating reels the spindles of which are each movably engaged with a transverse guide track on the base of the rear tape section of the housing.

In another form of the invention the tape reels in the rear tape section of the housing are located one on the other and are independently rotatable on a common spindle. Conveniently, the tape reels are spools with the periphery of adjacent flanges of each of the spools being gear toothed and the drive means could be a gear train between each of the spool flanges and a gear on a drive wheel in the forward housing section of the cassette.

The drive means may, however, be endless belts which rotatably connect each of the drive wheels to a tape reel in a suitable ratio which will cater for the larger than normal tape reel diameters in use.

The drive belts in both forms of the invention have a cross-sectional height of between 1 mm and 2 mm, a toothed drive surface and are steel strand reinforced.

BRIEF DESCRIPTION OF THE DRAWINGS

The invention is now described by way of example only with reference to the accompanying diagrammatic drawings in which.

DETAILED DESCRIPTION OF THE ILLUSTRATED EMBODIMENTS

Figure 1:
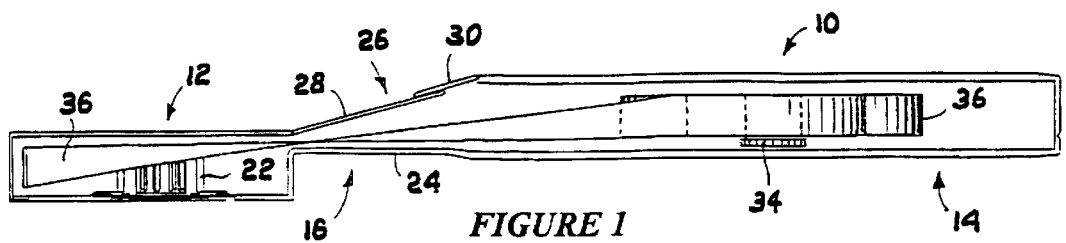
FIG. 1 is a sectioned side elevation of one embodiment of the cassette of the invention.
Figure 2:
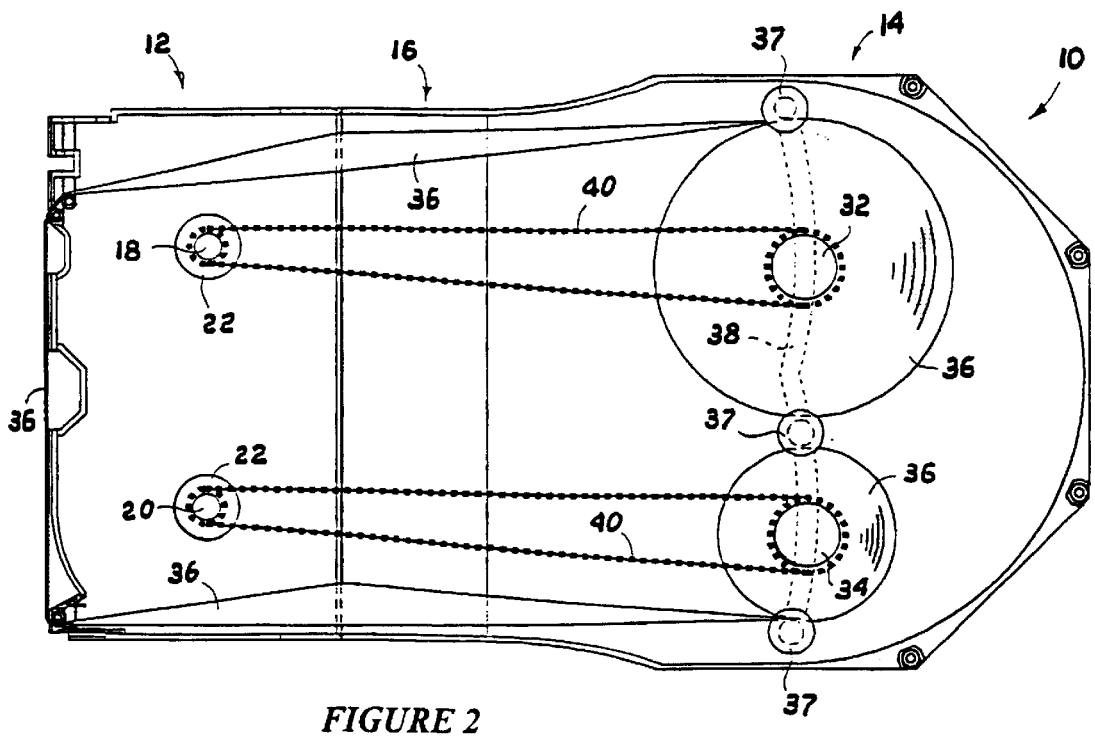
FIG. 2 is a plan view of the FIG. 1 cassette with its upper cover removed.

The embodiment of the cassette 10 of the invention illustrated in FIGS. 1 to 4 is shown in the drawings to include a composite housing including a forward housing section 12, a rear tape section 14 and a bridge section 16.

The housing section 12 is a conventional VHS video tape cassette in which the normal tape spools have been replaced by geared drive wheels 18 and 20 which are fixed to and carried by the conventional tape spool recorder drive spindle engaging sockets 22.

Figure 3:
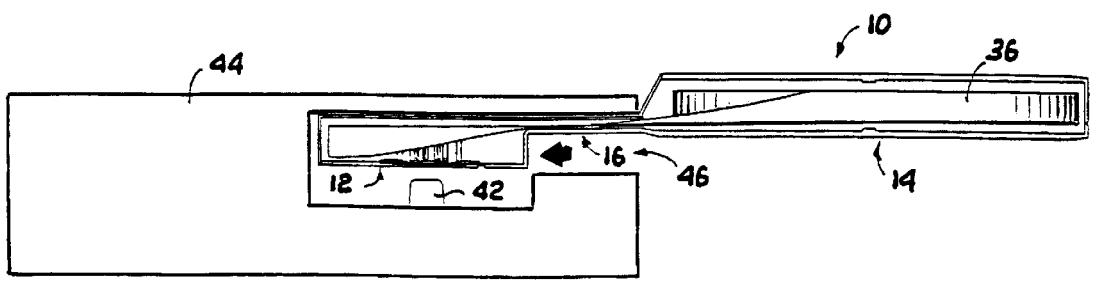
FIGS. 3 and 4 are sectioned side elevations of the cassette of FIGS. 1 and 2 illustrating the method of loading the cassette into a front loading VCR recorder.
Figure 4:
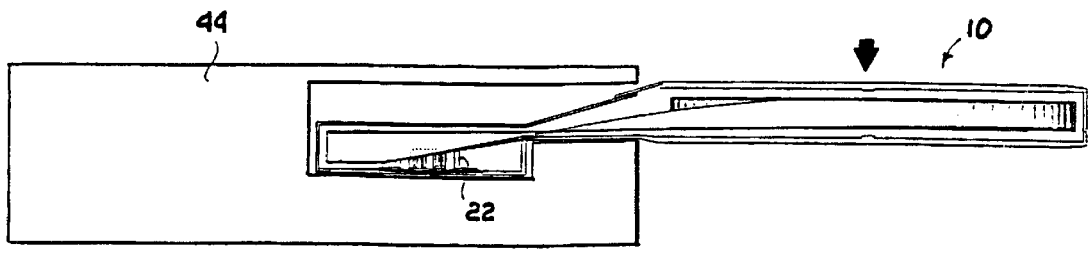

The floor 24 of the housing bridge section 16 extends from a high position on the rear wall of the section 12 to the base of the rear housing section 14 as shown in FIGS. 1, 3 and 4. The upper wall 26 bridge cover extends from the upper surface of the forward housing section 12 to the upper surface of the rear housing section 14. The wall 26 is composed of flaps 28 and 30 which extend over the width of the cassette 10. The flap 28 is hinged at its lower edge to the housing section 12 and the flap 30 is similarly hinged to the upper front edge of the housing section 14. The flap 28 is upwardly and flap 30 downwardly biased by light coil springs.

The rear housing section 14 of the cassette carries two tape reels 32 and 34 onto which the recording tape 36 is wound. The tape reels 32 and 34 are freely rotatable on spindles which could be fixed in the housing but in this embodiment of the invention, the spindles are slidably engaged with a suitable track 38, such as a groove or rail on the base of the housing, to enable the reels of tape to float as their diameters are varied during recording on or playback from the tape.

The upper and lower flanges of three empty spools 37 overlie the edges of the tape reels and are separated by the width of the tape 36 to guide the tape to and from the reels. The two outer guide spools are rotatably fixed at the ends of the track 38 while the spindle of the central spool is movably engaged with the track 38 to remain between and in tape guiding contact with the spooled tapes while floating backwards and forwards on the track as the diameters of the spooled tapes vary in use.

The drive wheels 18 and 20 and the tape reels 32 and 34 carry gear teeth and are connected, as shown in the drawing, by endless drive belts 40.

The drive belts 40 are made from a suitable rubber or rubber-like compound and have a cross-sectional height of between 1 mm and 2 mm, a toothed drive surface which is engaged with the gear teeth on the drive wheels and tape reels and are reinforced by steel strands.

The tape 36 is fed, in use, from one of the spools of tape in the rear housing section 14 through the bridge section 16, into the forward housing section 12, over the conventional guide rollers in the forward housing section, and back through the bridge to the remaining tape spool.

The gear ratio between each of the drive wheels and the tape reel which it drives is about 3:1 to maintain the required constant tape speed through the cassette without undue tape tension or slack in use.

Because of the necessary narrow throat from the bridge 16 into the forward housing section 12 the significantly wider tape 36 is partially twisted over the bridge floor 24, as shown in the drawings, to pass easily through the throat. The cassette could include suitably positioned inclined or tapered low friction rollers for predisposing the required degree of twist in the tape as it enters and leaves the bridge 16.

In addition to the bridge 16 providing a tape and drive arrangement passage between the spaced forward and rear sections of the cassette housing its main function is to enable the forward section 12 of the cassette to be introduced into and lowered onto the drive spindles 42 of a conventional front loading VHS VCR recorder 44 while the rear tape section 14 remains on the outside of the recorder, as shown in FIGS. 3 and 4.

As seen in FIG. 3, the forward housing section 12 of the cassette of the invention is fed into the recorder front load opening 46 in the conventional manner. The flap 28 of the bridge cover 26 abuts the upper edge of the recorder opening and, as the cassette is drawn into the loading space of the recorder, is pressed downwardly against its bias and is followed by the downwardly biased flap 30 to the FIG. 3 position of the flaps. The recorder loading mechanism then lowers the cassette forward section 12 until the recorder drive spindles 42 are located in the drive wheel sockets 22 in the cassette as shown in FIG. 4. The recorder and cassette 10 are now operated conventionally with the tape drive mechanism of the recorder controlling the tape feed, by means of the drive wheels 18 and 20, in the conventional manner from and to the cassette.

Figure 5:
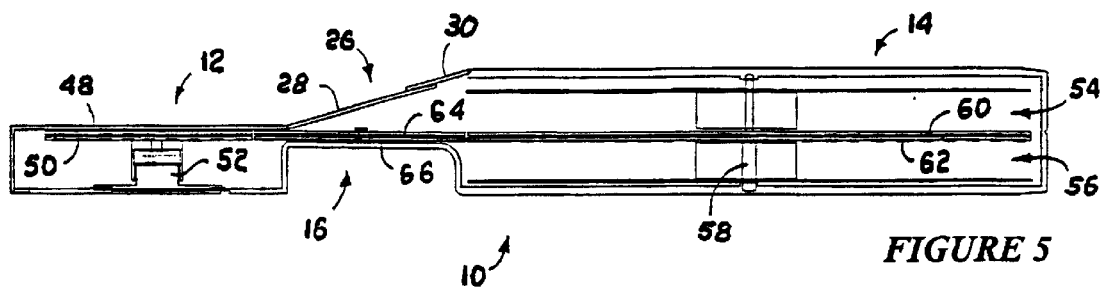
FIG. 5 is a sectioned side elevation of a second embodiment of the cassette of the invention.
Figure 6:
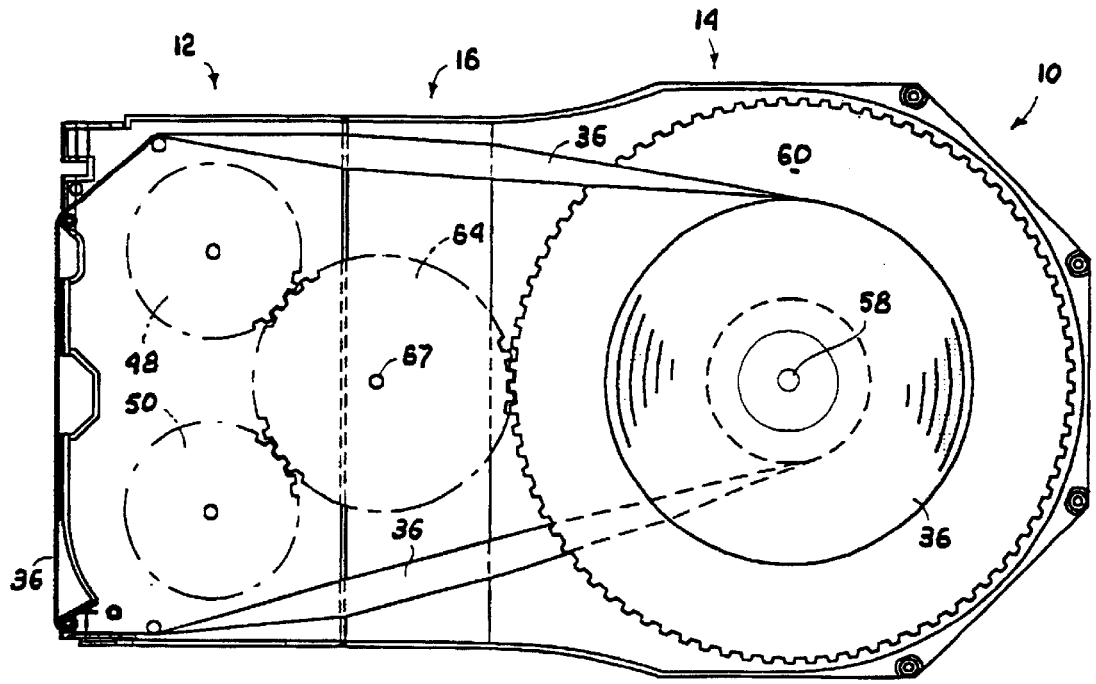
FIG. 6 is a plan view of the FIG. 5 cassette with its upper housing surface removed.
Figure 7:
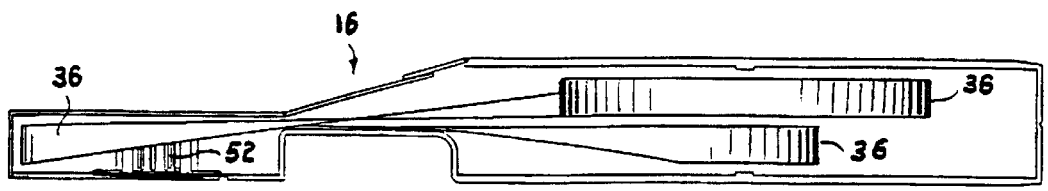
FIG. 7 is a sectioned side elevation of the cassette of FIGS. 5 and 6 illustrating the tape arrangement in the cassette.

In the FIGS. 5 to 7 embodiment of the cassette of the invention like reference numbers to those used in the explanation of the FIGS. 1 to 4 embodiment of the cassette are used to denote like cassette components.

In this embodiment of the invention the forward cassette section drive wheels are gears 48 and 50 which are attached to the recorder drive spindle engaging sockets 52. The gear 48 is arranged to be situated slightly above the gear 50.

The tape reels, which in this embodiment are spools 54 and 56, in the rear tape section 14 of the cassette housing are arranged one above the other and are freely rotatable on a common spindle 58. The peripheries of adjacent flanges 60 and 62 of the spools are geared. Two idler gears 64 and 66, which are freely rotatable on a common spindle 67, are meshed with the drive gears 48 and 50 and the tape spool gears 60 and 62 to make up the gear train drive of the tape spools.

The tape path through this embodiment of the cassette of the invention and its method of operation are much the same as those described with reference to the embodiment of FIGS. 1 to 4.

Figure 8:
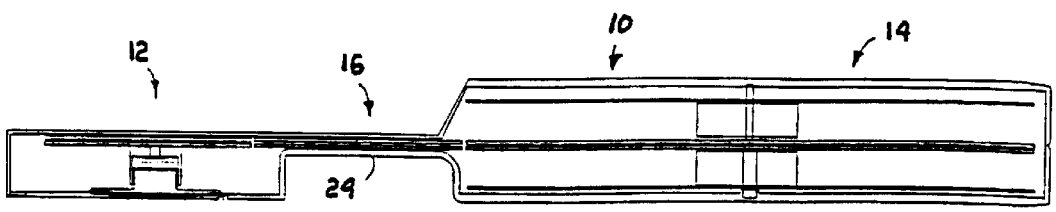
FIG. 8 is yet a further embodiment of a cassette similar to that of FIGS. 5 and 6.

The FIG. 8 cassette, which is of the FIGS. 5 to 7 type, merely illustrates that the downwardly collapsible bridge cover of the earlier embodiment, although preferable, is not essential to the invention. With the FIG. 8 fixed bridge section 18 the tape twist guide rollers on either side of the bridge 16 may be more necessary than with the FIGS. 1 to 4 embodiment of the invention.

The length of the video recording tape in a conventional four hour VCR cassette is about 330 metres. The drawings of FIGS. 1 to 8 are drawn very nearly to scale and with the relative proportions of the cassette housing components 12, 14 and 16, bearing in mind that the housing section 14 is identically sized to a conventional VCR tape cassette, the length of the tape 36 is 1.975 metres which will provide a real recording and playback time of twenty-four hours while recording at a conventional tape speed of 22 mm/second (PAL).

The invention is not limited to the precise details as herein described. For example, in the FIGS. 1 and 2 embodiment of the cassette of the invention the tape reels 32 and 34 could be gear driven in a manner similar to that of the FIGS. 5 and 6 embodiment and similarly the FIGS. 5 and 6 cassette tape reels could be belt driven.

What is claimed is:

1. An increased capacity VCR tape cassette (10) for use with a front loading VHS VCR recorder (44) comprising;

a forward housing section (12) which conforms to a standard VCR tape cassette in which the tape spools are replaced by drive wheels (18, 20 and 48, 50) which are adapted for releasable engagement with tape drive spindles (52) of the recorder, a rear tape section (14) which includes a pair of rotatable tape reels (32, 34 and 54, 56), and which, in use, is located on the outside of a cassette opening (46) to the recorder, a bridge section (16) which defines a passage which extends from an upper level of a rear wall of the forward housing section (12) to the rear tape section (14) with the passage including a throat which has a dimension, normal to the plane of the tape reels (32, 34 and 54, 56), which is less than the width of the recording tape (36) with the tape in its passage through the bridge section (16) of the cassette (10) being partially twisted from the orientation in which it is situated on the drive wheels (18, 20 and 54, 56) and reels (32, 34 and 54, 56) of the cassette (10) to permit its passage through the bridge (16), a significantly longer than standard recording tape (36) which is wound on the two tape reels (32, 34 and 54, 56) and passes from a first tape reel (32, 54) through the bridge (16) passage into the forward cassette section (12) to be recorded on and from the cassette section (12) back through the bridge (16) passage and onto the second tape reel (34, 56), and drive means (40 and 64, 66) which extend from the forward cassette section (12) drive wheels (18, 20 and 54, 56) through the bridge (16) passage and to the tape reels (32, 34 and 54, 56) in the rear tape section (14) of the cassette (10) housing.

2. A tape cassette as claimed in claim 1 wherein the upper surface of the rear tape section (14) is parallel to and situated above the upper surface of the forward housing section (12) of the cassette (10) and the bridge section (16) includes a floor (24) which is parallel to the upper surfaces of the forward (12) and rear (14) housing sections and which extends from a position on the rear wall of the forward housing section (12) slightly below the upper surface of the forward housing section (12) to the rear tape section (14) and a cover piece (26) which extends from the upper surface of the forward housing section (12) to the rear tape section to define between it and the bridge section (16) floor (24) the bridge (16) passage.

3. A tape cassette as claimed in claim 2 wherein the bridge section (16) extends over the width of the cassette (10) and the bridge cover piece (26) is upwardly inclined from the upper surface of the forward housing section (12) to the rear tape section (14) with the cover (26) comprising a first flap (28) which is hingedly attached and upwardly biased to the forward housing section (12) with the width of the flap (28) being such that its free edge parallel to the hinge, when the flap is pressed downwardly against its bias, is situated, on full insertion of the cassette (10) into the recorder (44) opening (46), on the outside of the opening (46) and a second flap (30)which is hingedly connected to the rear tape section (14) with its edge portion, parallel to its hinge, bearing on the upper surface of the first cover flap (28).

4. A tape cassette as claimed in 1 wherein the tape reels (32, 34) in the rear tape section (14) of the cassette (10) housing are arranged in a side by side relationship in a common plane and are floating reels (32, 34) the spindles of which are each movably engaged with a transverse guide track (38) on the base of the rear tape section (14) of the housing (10) with the drive means being endless belts (40) which rotatably connect each of the drive wheels (18, 20) to a tape reel (32, 34) in a suitable drive ratio which will cater for the larger than normal tape (36) reel (32, 34) diameters.

5. A tape cassette as claimed in claim 4 wherein the tape reels (54, 56) in the rear tape section (14) of the housing are located one on the other and are independently rotatable on a common spindle (58) with the drive means being endless belts (40) which rotatably connect each of the drive wheels (48, 50) to a tape reel (54, 56) in a suitable ratio which will cater for the larger than normal tape (36) reel (54, 56) diameters in use.

6. A tape cassette as claimed in claim 5 wherein the drive belts (40) have a cross-sectional height of between 1 mm and 2 mm, a toothed drive surface and are steel strand reinforced.

7. A tape cassette as claimed in claim 1 wherein the tape reels (54, 56) in the rear tape section (14) of the housing are located one on the other and are independently rotatable on a common spindle (58) with the tape reels being spools (54, 56) with the periphery of adjacent flanges (60, 62) of each of the spools (54, 56) being gear toothed and the drive means is a gear train (64, 66) between each of the spool flanges (60, 62) and a gear on a drive wheel (48, 50) in the forward housing section (12) of the cassette (10).

8. A tape cassette as claimed in claim 1 wherein the tape reels (54, 56) in the rear tape section (14) of the housing are located one on the other and are independently rotatable on a common spindle (58) with the drive means being endless belts (40) which rotatably connect each of the drive wheels (48, 50) to a tape reel (54, 56) in a suitable ratio which will cater for the larger than normal tape (36) reel (54, 56) diameters in use.

* * * * *